July 8, 1952 A. GARBACCIO 2,602,582
REGULATING DEVICE
Filed Dec. 11, 1948
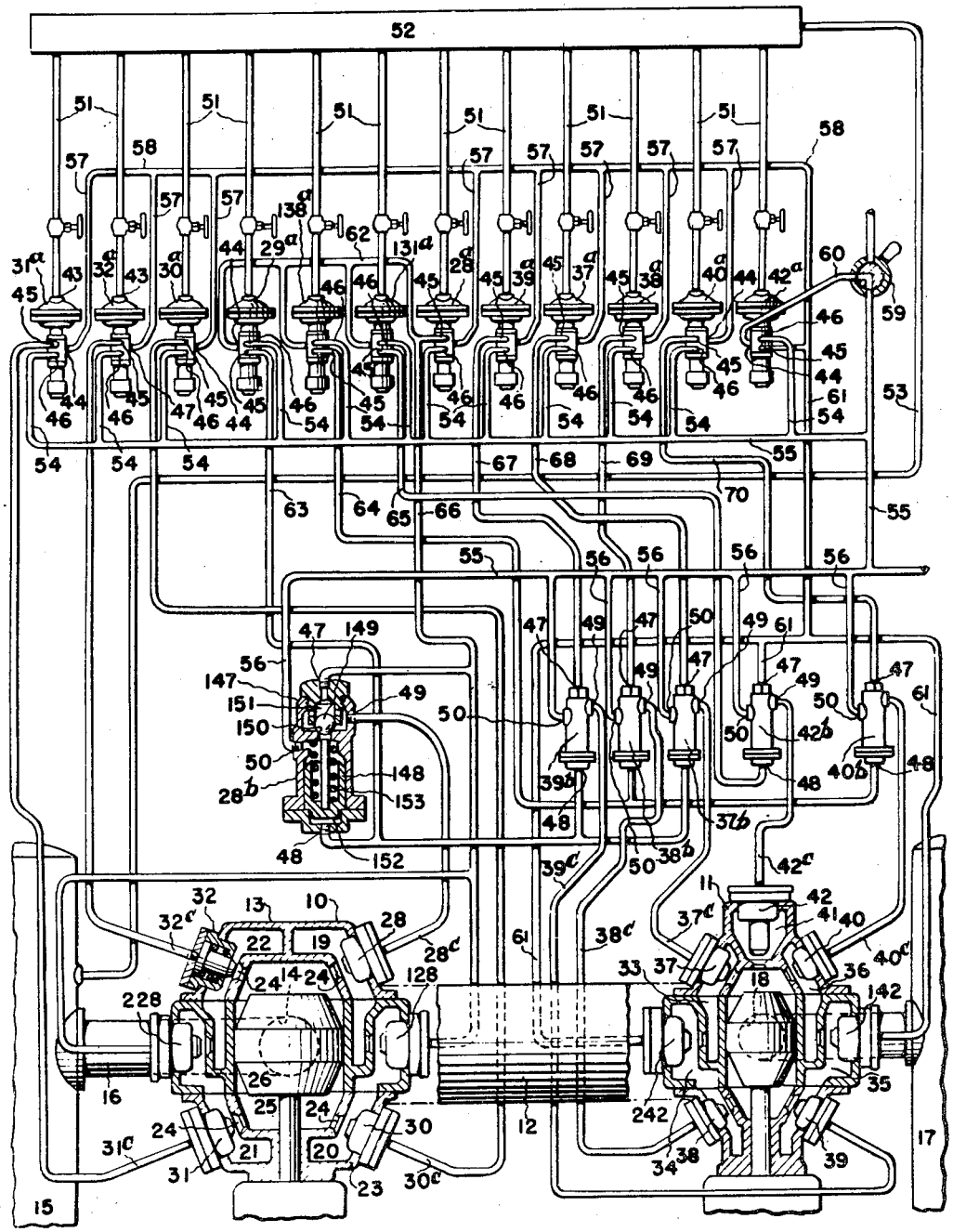
INVENTOR
ALBERT GARBACCIO.
BY
HIS ATTORNEY.

Patented July 8, 1952

2,602,582

UNITED STATES PATENT OFFICE 2,602,582

REGULATING DEVICE

Albert Garbaccio, Phillipsburg, N. J., assignor to Ingersoll-Rand Company, New York, N. Y., a corporation of New Jersey Application December 11, 1948, Serial No. 64,770

7 Claims. (Cl. 230—21)

This invention relates to regulating devices and more particularly to clearance control systems for multistage compressors.

Heretofore, various regulating systems have been utilized to effect step by step loading or unloading of a compressor in order to maintain a prescribed discharge rate from the compressor. However, such systems were found to be unsatisfactory under conditions wherein the compressor was required to operate with a varying or decreasing suction pressure as, for example, the condition which exists when gas is being evacuated from a pressure tank and it is desired to have the gas being evacuated discharged from the compressor at a constant weight rate.

Experimentation has shown that regulators of the well known type are unable to maintain the weight rate of discharge from the compressor within the desired range when the compressor is required to operate under the above stated conditions and, further, that the system, as a whole, was otherwise inefficient in that a compressor of far greater capacity than was normally required for a greater portion of the cycle was needed in order to maintain a required discharge rate for a short period of each cycle. The cycle in this instance being the complete evacuation of gas from the cylinder.

It is, accordingly, one object of my invention to provide a regulating system for a multistage compressor to effect a substantially constant weight rate of fluid discharged from the compressor.

A further object of my invention is to provide a control system which will effect the loading and unloading of the various stages of a multistage compressor a plurality of times during each cycle of operation.

Further objects will become apparent from the following description and accompanying drawing which is a view, partly in section, of a regulating system constructed in accordance with the practice of the invention and adapted to a multistage variable-capacity compressor.

Referring to the drawing, the mutistage variable-capacity compressor shown comprises, in general, a high pressure cylinder, or stage 11, connected through a suitable intercooler 12, a portion of the casing being shown, to the low pressure cylinder, or stage 13, which, in turn, has its inlet 14 connected to a pressure tank 15 by a pipe 16. In this particular installation, the purpose of the compressor 10 is to evacuate gas under pressure from the tank 15 and discharge it at a constant weight rate into a pressure tank 17 connected to the outlet 18 of the high pressure stage 11. In order to maintain such a discharge rate, it is necessary to vary the degree of loading and unloading of the two stages during each cycle or evacuation of the tank 15.

In furtherance to this end, the compressor is provided with clearance and by-pass valves controlled either directly by primary control devices, such as the valve 32$^a$, which acts responsively to decrements in suction pressure for supplying power to actuate said clearance valves; or indirectly by a set of secondary control devices, such as the poppet valve 28$^b$ connected to some of the first said devices for controlling the supply of power to actuate the clearance valves associated therewith and coacting with such devices to actuate the clearance valves with which they are associated a plurality of times during every evacuating cycle of the compressor.

In the embodiment shown, these devices are arranged to effect initially complete loading of the second stage compressor 11, then complete unloading of the second stage compressor except for the by-pass valves 142 and 242 and partial loading of the first stage 13, then complete loading of the second stage compressor 11 followed by complete loading of the first stage compressor; and finally complete unloading of both stages when the tank 15 has been evacuated; the loading of the individual stages of the compressor being done in a step by step fashion. Experimentation has shown that a compressor operating under the condition previously mentioned and having a clearance control cycle as herein set forth and to be explained in greater detail hereinafter, will operate effectively and efficiently to maintain within narrow limits a constant weight rate of fluid discharge from the compressor.

The compressors shown are of the usual double acting reciprocatory type and the low pressure cylinder, or stage 13 is, accordingly, provided with clearance valves 28, 30, 31 and 32 for their respective clearance pockets 19, 20, 21 and 22 formed in the casing 23 and communicated through ports 24, controlled by said valves, with a compression chamber 25 for a reciprocative piston 26. By-pass valves 128 and 228 control communication between pairs of clearance pockets 19 and 20, and 21 and 22 respectively.

The high pressure cylinder, or stage 11, is similar in construction to the low pressure stage 13 with the exception that it is provided with a backhead clearance valve 42 for the clearance pocket 41. The usual side clearance pockets 33, 34, 35 and 36 are controlled, respectively, by clearance valves 37, 38, 39 and 40. The by-pass valve for controlling communication between the clearance pockets 33 and 34 is designated by 242, and 142 designates the by-pass valve which controls communication between the clearance pockets 35 and 36. The clearance valves shown are of the spring pressed type being actuated into the closed position by pressure fluid, the flow of which is controlled by the aforementioned control devices.

As previously mentioned, the clearance and by-pass valves of the compressor are controlled either directly or indirectly by devices responsive to decrements in suction pressure of the first stage compressor. In the embodiment shown, these devices are similar to the type of control devices shown and described in detail in the C. W. Metzgar Patent #2,125,355.

Briefly, this valve (referred to valve 31a) is designed to allow pressure fluid to pass from an inlet 44 to an outlet 45, disposed on opposite sides of the valve, whenever the pressure at an intake 43, at one end of the valve, is below a predetermined value; and to cut off the flow of fluid through the inlet 44 and communicate the outlet 45 with an exhaust port 46, adjacent the outlet 45, whenever the intake pressure is above said predetermined value. The valves 31a, 32a, 30a, 28a, 39a, 37a, 38a and 40a are of this type. The reverse function i. e., the function whereby communication is established between the inlet 44 and outlet 45 whenever the intake pressure is above a predetermined value, and the outlet 45 is communicated with the exhaust 46 whenever the intake pressure is below said value, is attained by a minor rearrangement (as shown in said Metzgar patent) of the valve 31a—substantially this modification consists of reversing the outlet and exhaust connections as shown for the valves 29a, 138a, 131a and 42a which function in this manner.

In the present showing, in order to permit ease in distinguishing between valves of the type 31a and of the type 29a, the former type is shown with the conduits connected to their outlets 45 and exhausts 46 approaching on the left hand side of the valve; and the latter type or reverse function valve is shown with such conduits approaching from the right hand side of the valve.

The secondary valves, controlled by the primary control valves, are of the well known poppet type (refer to valve 28b) and comprise, in general, a housing 147 for a spring pressed plunger 148 which is actuated to unseat a ball 149 from seat 150 and move it onto an opposing valve seat 151 thereby cutting off the flow of fluid through the valve inlet 47, at one end of the housing 147, and communicating the outlet 49 on one side of the housing 147 with the exhaust port 50 positioned on the opposite side of the housing 147. When the ball is on its seat 150, communication is established between the inlet 47 and the outlet 49, and the exhaust port 50 is sealed against the flow of fluid therethrough.

The plunger 148 is actuated whenever the force of pressure fluid on a pressure surface 152 on one end of the plunger 148 is sufficient to overcome the spring 153. In furtherance of this, an intake 48 is provided at the end of the housing 147 opposite the inlet 47, to admit pressure fluid to the pressure surface 152 and is, accordingly, connected through a conduit to the outlet 45 of one of the primary control devices. In this manner, the valve action of the secondary valves 28b, 39b, 38b, 37b, 42b and 40b are controlled by the primary valves to which they are connected— that is, the plunger 148 is actuated to move the ball 151 to exhaust fluid from the clearance valve to which the secondary valve is connected, whenever the primary valve with which it is associated valves pressure fluid to the intake 48; and the ball 149 returns to its seat 150 under the force of gravity and the force of pressure fluid entering the valve chambers through the inlet 47 to valve pressure fluid to close the associated clearance valve, whenever said primary valve exhausts pressure fluid from the intake 48.

As was previously mentioned, some of the clearance valves of the compressor were controlled directly by the primary control valves acting responsively to suction pressure. The low pressure stage clearance valves 30, 31 and 32 are in this category and are, therefore, supplied directly with motive or actuating fluid through their respective conduits 30c, 31c and 32c connected, respectively, with the outlets 45 on the valves 30a, 31a and 32a. The intakes 43 of these valves, as are the other primary control valves 29a, 138a, 131a, 28a, 39a, 37a, 38a, 40a and 42a of this general type, connected by means of conduits 51 to a header 52 communicated with the pressure tank 15 through a conduit 53 and are thereby exposed to the suction pressure of the compressor at all times and act responsively to decrements in pressure thereof. The exhaust ports 46 of the valves 30a, 31a, 32a and the other said valves of this general type, are connected through branch pipes 54 to the main exhaust conduit 55. The conduit 55 is also provided with branch pipes 56 connected to the exhaust ports 50 of the secondary control valves 28b, 39b, 38b, 37b, 42b and 40b.

Motive fluid for actuating the clearance and by-pass valves is supplied to the control valves 31a, 32a, 30a, 28a, 39a, 37a, 38a and 40a, which are actuated below predetermined intake pressure values to communicate their inlets 44 with their outlets 45, through branch pipes 57 connected between the inlets 44 of these valves and the main supply conduit 58 which, in turn, is connected to the outlet 45 of the master control valve 42a of the type which functions to communicate its inlet 44 with its outlet 45 above a predetermined intake pressure, in this instance, a few p. s. i. gage. Thus, whenever the pressure in the header 52 is above atmospheric pressure, fluid under pressure is supplied to those valves connected to the master valve 42a through the conduit 58. Motive fluid for actuating the secondary valves is supplied to the other, reverse functioning, primary valves 29a, 138a and 131a through a conduit 62 connected between the inlets 44 of these valves and the outlet 45 of the secondary master valve 28a.

The valve 42a, in turn, receives its supply of such motive fluid through a conduit 60 from a source (not shown). Inserted in the conduit 60 is a manually operated three way valve 59 to which is also connected a branch of the main exhaust conduit 55. In one control position, the valve 59 communicates the valve 42a with the source of pressure fluid, and in another position exhausts the valve 42a through the conduit 55.

The outlet 45 of the valve 42a is also connected to the inlet 47 of the secondary valve 42b and to the by-pass valves 142 and 242 through a conduit 61 which is a continuation of the supply conduit 58. Thus the by-pass valves 142 and 242 are closed whenever the valve 42a is supplied with pressure fluid and the value of the pressure in the header 52 exceeds atmospheric pressure, and the clearance valve 42 is closed under similar conditions whenever pressure fluid is exhausted from the intake of the secondary valve 42$^b$. Valve 42$^b$, in this instance, has its intake 48 connected through a conduit 65 to the inlet of the primary valve 131$^a$ and its outlet 49 connected to the valve 42 through a conduit 42$^c$. The outlet 45 of the valve 29$^a$ is connected through a conduit 63 to the intakes 48 of the secondary valves 28$^b$, 39$^b$ and 37$^b$ which in turn have their outlets 49 connected, respectively, to the clearance valves 28, 39 and 37 by conduits 28$^c$, 39$^c$ and 37$^c$ respectively. The outlet 45 of the valve 138$^a$ is connected through a conduit 64 to the intakes 48 of the valves 38$^b$ and 40$^b$ which in turn are connected, respectively, through conduits 38$^c$ and 40$^c$ to their respective valves 38 and 40. A branch 66 of the conduit 62 connects the inlet 47 of the valve 28$^b$ to the by-pass valves 128 and 228.

With this arrangement, it is now apparent that the valve 28$^a$ serves as a secondary master valve in that it directly controls the operation of the by-pass valves 128 and 228 of the low pressure stage and indirectly controls the operation of the clearance valves 28, 37, 38, 39, 40 and 42. Further, it is to be noted that the valve 42$^a$ serves as a master valve in that it controls the flow of motive fluid to all the primary control valves which are actuated below a predetermined intake pressure to valve motive fluid to the clearance valves of the compressor or to the inlets 47 of the secondary valves, as the case may be. More particularly, the master valve 42$^a$ controls the valves 30$^a$, 31$^a$ and 32$^a$ connected directly to the clearance valves 30, 31 and 32, and the valves 39$^a$, 37$^a$, 38$^a$ and 40$^a$ which supply pressure fluid through their respective conduits 67, 68, 69 and 70 to the inlets of the secondary valves 39$^b$, 37$^b$, 38$^b$ and 40$^b$, respectively. Further, the valve 42$^a$ controls the flow of motive fluid to the valve 28$^a$ which in turn controls the flow of fluid to the primary valves 29$^a$, 138$^a$ and 131$^a$.

As was previously mentioned, some of the primary valves are designed to communicate the inlet 44 with the outlet 45 whenever the pressure at the intake 43 falls below a predetermined value; and above said value, the inlet 44 is closed and the outlet 45 is communicated with the exhaust 46, while the remaining primary valves, of this type, function in the reverse. For any one valve, the exact value at which this valve action occurs is, of course, dependent on the particular operating condition in which the system is adapted. However, there are general relative pressure values at which the various primary control valves are actuated.

In the arrangement shown, the valve 40$^a$ is designed to operate at a few pounds below the initial gas pressure in the tank 15 and the valve 31$^a$ is designed to operate at a few pounds gage. The intermediate valves operate successively at predetermined decrements in pressure. For example, assuming the tank 15 is filled with a gas to be evacuated and the valve 59 has been positioned to communicate the valve 42$^a$ with a source of motive fluid at say, 90 p. s. i. gage, through the conduit 60, briefly the operation of the regulator is as follows.

The master valve 42$^a$ will valve motive fluid for actuating the clearance valves, to the primary valves in the manner hereinbefore described. The valves 40$^a$, 38$^a$, 37$^a$, 39$^a$ and 28$^a$ are designed to operate then, in the order named, at succeeding decrements in suction pressure to permit the flow of pressure fluid to the secondary valves to which they are connected. For example, assuming an initial header or suction pressure of 133 pounds gage, the valve 40$^a$ is actuated at 127 pounds gage to valve fluid to the secondary control valve 40$^b$ which in turn will valve pressure fluid to close the clearance valve 40. The valve 38$^a$ is then actuated when the header pressure drops to 122 pounds gage to valve fluid to the valve 38$^b$ which closes the clearance valve 38, and so on until the secondary master valve 28$^a$ is actuated, at say 86 pounds gage, to valve fluid to the valves 131$^a$, 138$^a$ and 29$^a$. The last three named valves will, of course, immediately permit the flow of motive fluid therethrough to their associated secondary valves thereby exhausting pressure fluid from all the clearance or by-pass valves connected thereto. At succeeding decrements in header or suction pressure these valves, 131$^a$, 138$^a$ and 29$^a$ will act, in the order named, to exhaust fluid from the intake of the secondary control valves to which they are connected thereby permitting pressure fluid to again flow through their secondary valves to close the clearance or by-pass valves to which they are connected.

When the header pressure drops, say to 67 pounds gage, valve 29$^a$ is actuated to exhaust the valves 28$^b$, 39$^b$ and 37$^b$ and the valves 30$^a$, 32$^a$ and 31$^a$ will then act in the order named at succeeding decrements in pressure to valve motive fluid for actuating the clearance control valves to which they are connected.

In somewhat greater detail, the function of the control system is as follows. The valve 42$^a$ immediately, upon being supplied with motive fluid, will valve such fluid to the primary valves 40$^a$, 38$^a$, 37$^a$, 39$^a$, 28$^a$, 30$^a$, 32$^a$ and 31$^a$ and to the intake of the secondary valve 42$^b$ and thence to the backhead clearance valve 42, which is actuated into the closed position, and to the by-pass valves 142 and 242, thereby partially loading the high pressure stage 11. Successive decrements in pressure in the header 52 cause the valves 40$^a$, 38$^a$, 37$^a$ and 39$^a$ to be actuated in said order to close, through the associated secondary valves 40$^b$, 38$^b$, 37$^b$ and 39$^b$, the clearance valves 40, 38, 37 and 39 thereby completely loading the high pressure stage 11 in a step by step fashion.

When the fluid pressure in the header 52 falls to a value at which the valve 28$^a$ is actuated, pressure fluid is valved to the by-pass valves 128 and 228, thereby partially loading the low pressure stage, and to the inlet 47 of the valve 28$^b$. However, the inlet 47 of the valve 28$^b$ is closed inasmuch as pressure fluid is simultaneously valved to the primary valves 131$^a$, 138$^a$, and 29$^a$ which permit pressure fluid to flow to the intakes 48 of the secondary valves 28$^b$, 39$^b$, 38$^b$, 37$^b$, 42$^b$ and 40$^b$. With this valve action, pressure fluid is exhausted from the clearance valves 37, 38, 39, 40 and 42 through the secondary valves thereby unloading the high pressure stage 11 except for the clearance valves 142 and 242.

Subsequent decrements in pressure in the header 52 cause the valves 131$^a$, 138$^a$ and 29$^a$ to be actuated, successively, to exhaust fluid from the intakes 48 of the secondary valves to which they are connected thereby reloading the high pressure stage 11 and increasing the load on the low pressure stage 13. More particularly, the valve 131$^a$, when actuated, releases the valve 42$^b$ thereby closing the clearance valve 42, then the valve 138$^a$ is actuated at a somewhat lower suction pressure to close, by releasing the secondary valves 38ᵇ and 40ᵇ, the valves 38 and 40. The clearance valves 37 and 39 are subsequently closed in a similar manner, by the action of valve 29ᵃ thereby completely loading the high pressure stage 11. The valve 29ᵃ simultanously exhausts the valve 28ᵇ to load further the low pressure stage 13. The valves 30ᵃ, 32ᵃ and 31ᵃ are actuated in response to further decrements in suction pressure to close the clearance valves 30, 32 and 31 in the order named, thereby completely loading the low pressure stage 13. At this point in the cycle, the compressor is completely loaded and the fluid pressure within the tank 15 is only a few pounds gage. When the pressure within the tank 15 becomes substantially zero pounds gage, the valve 42ᵃ is actuated to exhaust fluid from the entire regulating system thereby completely unloading both stages of the compressor.

It is now apparent from the previous discussion that a regulating system constructed in accordance with the practice of the invention accomplishes, among others, the objects hereinbefore stated.

While I have shown and described specific forms of my invention, it is to be understood that various changes and modifications may be made without departing from the spirit of the invention as set forth in the appended claims.

I claim:

1. The combination with a compressor having clearance pockets and clearance valves therefor, of primary control valves connected to the suction side of the compressor and connected to said clearance valves for controlling the operation of the clearance valves in response to decrements in the suction pressure, control devices connected between at least some of said primary control valves and the clearance valves controlled thereby and actuated to prevent or permit control of the clearance valves by said some of said primary control valves, reverse acting valves connected to the suction side of the compressor and connected to actuate said control devices in response to variations in suction pressure to bring some of said clearance valves into operation a plurality of times during each load cycle of the compressor, and a valve connected to the suction side of the compressor and to the reverse acting valves for preventing control of the reverse acting devices by such valves whenever the suction pressure is above a predetermined value intermediate the suction pressure values at the beginning and the end of the compressor load cycle.

2. The combination with a compressor having clearance pockets and clearance valves therefor, of primary control valves connected to the suction side of the compressor and connected to said clearance valves for actuating said valves in response to decrements in suction pressure below a predetermined value, control devices connected between some of said primary control valves and the clearance valves controlled thereby, reverse acting valves connected to the suction side of the compressor and connected to control the operation of the control devices in response to decrements in suction pressure below a predetermined value lower than the first said predetermined value such that some of said clearance valves are actuated a plurality of times during each load cycle of the compressor, and a valve connected to the suction side of the compressor and to the reverse acting valves for preventing control by such valves whenever the suction pressure is above the second predetermined value.

3. The combination with a compressor having clearance pockets and clearance valves therefor, of primary control valves connected to the suction side of the compressor and connected to said clearance valves for controlling the operation of the clearance valves in response to decrements in the suction pressure, control devices connected between some of said primary control valves and the clearance valves controlled thereby, reverse acting valves connected to the suction side of the compressor and connected to control said control devices in response to variations in suction pressure to bring some of said clearance valves into operation a plurality of times during each load cycle of the compressor, a secondary master valve connected to the suction side of the compressor and to the reverse acting valves for preventing control by such valves whenever the suction pressure is above a predetermined value intermediate the suction pressure values at the beginning and the end of the load cycle, and a master valve connected to the suction side of the compressor and connected to said primary control valves and to said secondary master valve for preventing or permitting the control by said primary control valves and secondary master valve in response to variations in suction pressure.

4. The combination with a compressor having clearance pockets and clearance valves therefor, of primary control valves connected to the suction side of the compressor and connected to supply power to actuate said clearance valves in response to decrements in suction pressure of the compressor, control devices connected between at least some of said primary control valves and the clearance valves actuated thereby for controlling the supply of power to actuate such clearance valves, a valve connected to the suction side of the compressor and connected to supply power to actuate said control devices whenever the suction pressure is below a predetermined value intermediate the suction pressure values at the beginning and end of the compressor cycle, and reverse acting control valves connected to the suction side of the compressor and connected between the last said valve and the control devices to control the supply of power to actuate said control devices in response to variations in suction pressure of the compressor such that the clearance valves controlled by the control devices are actuated a plurality of times during each load cycle of the compressor.

5. The combination with a compressor having clearance pockets and clearance valves therefor, of primary control valves connected to the suction side of the compressor and connected to supply power to actuate said clearance valves in response to decrements in suction pressure below a predetermined value, control devices connected between some of said primary control valves and the clearance valves actuated thereby for controlling the supply of power to actuate such clearance valves, a valve connected to the suction side of the compressor and connected to supply power to actuate said control devices to cut-off the supply of power to the clearance valves controlled thereby whenever the suction pressure is below a predetermined value lower than the first said predetermined value, and reverse acting control valves connected to the suction side of the compressor and connected between said valve and the control devices to control the supply of power to actuate said control devices and acting responsively to decrements in suction pressure below the second said predetermined value to cut-off power supplied to the control devices by said valve such that the clearance valves controlled by the control devices are actuated a plurality of times during each load cycle of the compressor.

6. The combination with a compressor having clearance pockets and clearance valves therefor, of primary control valves connected to the suction side of the compressor and connected to supply power to actuate said clearance valves in response to decrements in suction pressure below a predetermined value, control devices connected between some of said primary control valves and the clearance valves actuated thereby for controlling the supply of power to actuate such clearance valves, a secondary master valve connected to the suction side of the compressor and connected to supply power to actuate said control devices to cut-off the supply of power to the clearance valves controlled thereby whenever the suction pressure is below a predetermined value lower than the first said predetermined value, reverse acting control valves connected to the suction side of the compressor and connected between the secondary master valve and the control devices to control the supply of power to actuate said control devices and acting responsively to decrements in suction pressure below the second said predetermined value to cut-off power supplied to the control devices by the secondary master valve such that the clearance valves controlled by the control devices are actuated a plurality of times during each load cycle of the compressor, and a primary master valve connected to the suction side of the compressor and connected to supply power to said primary valves and the secondary master valve and acting to cut-off such supply whenever the suction pressure drops to some minimum value.

7. The combination of a multi-stage compressor having clearance pockets for each stage and clearance valves for said pockets, primary control valves connected to the suction side of the compressor and connected to supply power to actuate said clearance valves in response to decrements in suction pressure, control devices connected between some of said primary control valves and the clearance valves actuated thereby for controlling the supply of power to actuate such clearance valves, reverse acting control valves connected to the suction side of the compressor and connected to supply power to actuate said control devices and acting responsively to decrements in suction pressure below a predetermined value intermediate the suction pressures at the beginning and end of the compressor load cycle to cut-off the supply of power to the control devices, one of said primary control valves being connected to the reverse acting primary valves to supply the power controlled thereby at a predetermined suction pressure value higher than the first said predetermined value, and a master valve connected to the suction side of the compressor and connected to supply power to the primary valves and acting at a minimum suction pressure value below the second said predetermined pressure value to cut-off the supply of power to the primary control valves to unload the compressor.

ALBERT GARBACCIO.

REFERENCES CITED

The following references are of record in the file of this patent:

UNITED STATES PATENTS

| Number | Name | Date |
|---|---|---|
| 1,636,439 | Riesner | July 19, 1927 |
| 1,764,646 | Riesner | June 17, 1930 |
| 1,969,076 | Hirsch | Aug. 7, 1934 |
| 2,032,429 | Metzgar | Mar. 3, 1936 |
| 2,125,355 | Metzgar | Aug. 2, 1938 |
| 2,401,910 | Condit | June 11, 1946 |